United States Patent
Ueno

(10) Patent No.: US 10,866,488 B2
(45) Date of Patent: Dec. 15, 2020

(54) IMAGING APPARATUS AND CONTROL METHOD OF IMAGING APPARATUS

(71) Applicant: CANON KABUSHIKI KAISHA, Tokyo (JP)

(72) Inventor: Daiyu Ueno, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 114 days.

(21) Appl. No.: 16/243,527

(22) Filed: Jan. 9, 2019

(65) Prior Publication Data

US 2019/0219894 A1 Jul. 18, 2019

(30) Foreign Application Priority Data

Jan. 16, 2018 (JP) ................................. 2018-004993

(51) Int. Cl.
*G03B 13/16* (2006.01)
*H04N 5/232* (2006.01)
*G03B 13/36* (2006.01)
*H04N 5/225* (2006.01)
*G03B 17/14* (2006.01)

(52) U.S. Cl.
CPC ............ *G03B 13/16* (2013.01); *G03B 13/36* (2013.01); *G03B 17/14* (2013.01); *H04N 5/2254* (2013.01); *H04N 5/232933* (2018.08); *H04N 5/232939* (2018.08)

(58) Field of Classification Search
CPC ........ G03B 13/16; G03B 13/36; G03B 17/14; H04N 5/232939; H04N 5/232933; H04N 5/2254

USPC ..................................................... 348/333.02
See application file for complete search history.

(56) References Cited

U.S. PATENT DOCUMENTS

| 10,228,533 | B2* | 3/2019 | Shirai | H04N 5/23209 |
|---|---|---|---|---|
| 10,230,887 | B2* | 3/2019 | Okuyama | H04N 5/2254 |
| 10,412,292 | B2* | 9/2019 | Uemura | G03B 3/10 |
| 2012/0050604 | A1* | 3/2012 | Hamada | G02B 7/36 348/349 |
| 2016/0316139 | A1* | 10/2016 | Arai | H04N 5/23293 |
| 2017/0034424 | A1* | 2/2017 | Uemura | G03B 13/36 |
| 2017/0099428 | A1* | 4/2017 | Okuyama | H04N 5/2254 |
| 2017/0343768 | A1* | 11/2017 | Shirai | H04N 5/225 |
| 2018/0027163 | A1* | 1/2018 | Uchida | H04N 5/2351 348/361 |
| 2018/0081148 | A1* | 3/2018 | Tomita | G02B 7/09 |
| 2018/0124324 | A1* | 5/2018 | Takasawa | H04N 5/2254 |

FOREIGN PATENT DOCUMENTS

JP 2011-47985 A 3/2011

* cited by examiner

*Primary Examiner* — Pritham D Prabhakher
(74) *Attorney, Agent, or Firm* — Canon U.S.A., Inc. IP Division

(57) ABSTRACT

An imaging apparatus including a lens mount on which an interchangeable lens is mounted registers a position to which a focus adjustment position is moved when a specific operation is executed, determines a type of interchangeable lens mounted on the lens mount, and controls, when the specific operation is executed, switching the focus adjustment position to a position registered based on a determined type of mounted interchangeable lens regardless of the focus adjustment position before switching.

16 Claims, 10 Drawing Sheets

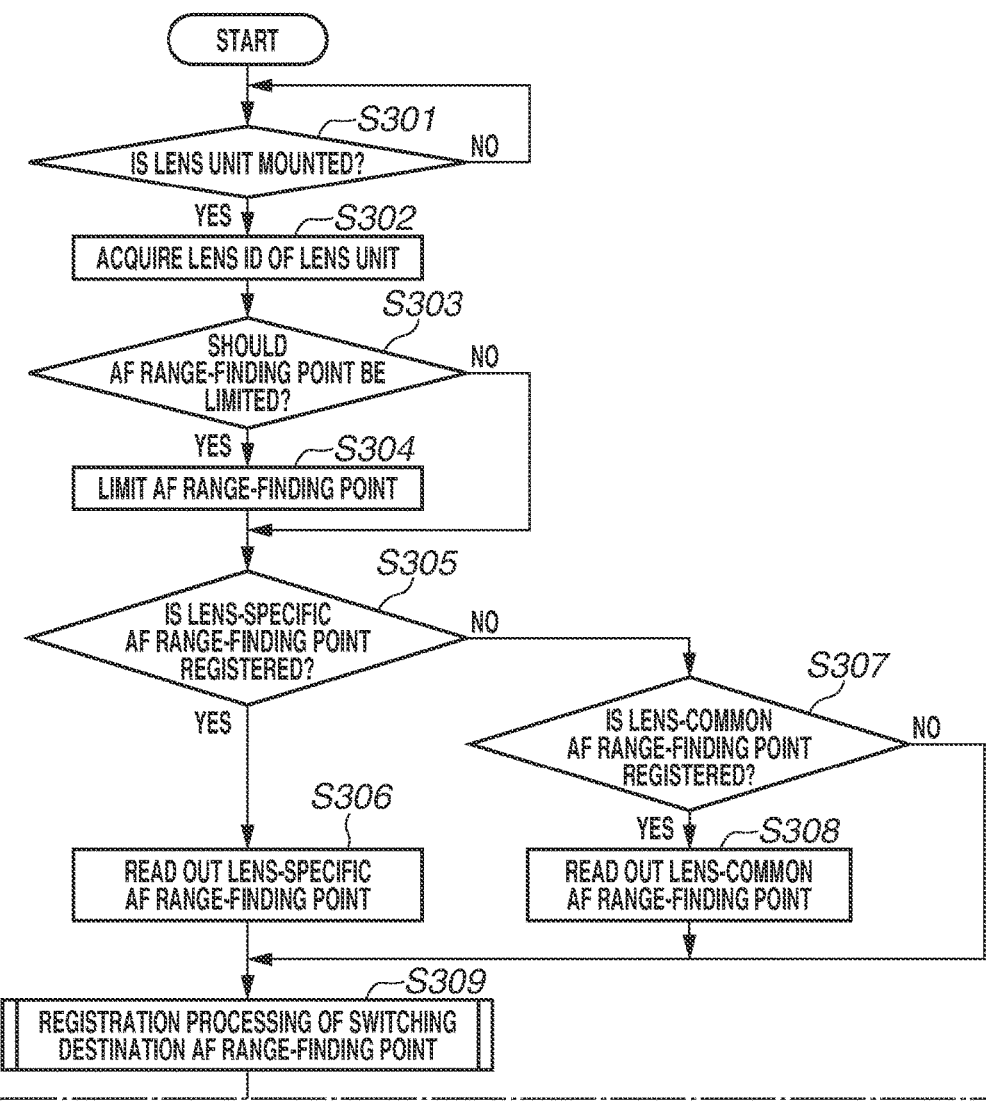

IMAGING APPARATUS AND CONTROL METHOD OF IMAGING APPARATUS

BACKGROUND

Field

The present disclosure relates to a setting technique of a focus adjustment position of an imaging apparatus including an interchangeable lens.

Description of the Related Art

An imaging apparatus that enables a user to register and easily call a frequently-used range-finding point from among a plurality of range-finding points is known.

An imaging apparatus discussed in Japanese Patent Application Laid-Open No. 2011-47985 enables a user to previously register range-finding points frequently used when a camera is held in a lateral orientation or a longitudinal orientation. Then, when the orientation of the camera is changed, the imaging apparatus executes range-finding and focusing control with a range-finding point registered in association with the changed orientation.

Depending on an interchangeable lens, the range-finding point registered through the technique described in Japanese Patent Application Laid-Open No. 2011-47985 may not be appropriate for a position where autofocus (AF) is executed. This is because a certain interchangeable lens may not be able to exhibit its AF performance sufficiently because of a relationship between the registered range-finding point and a characteristic unique to the lens, i.e., an amount of light entering thereto.

SUMMARY

The present disclosure is directed to a technique that enables an imaging apparatus to execute autofocusing at a position registered by a user even in a case where an interchangeable lens having a different characteristic is used.

According to an aspect of the present disclosure, an imaging apparatus includes a lens mount on which an interchangeable lens is mounted, a memory storing at least one program, and at least one processor that when executing the at least one program, registers a position to which a focus adjustment position is moved when a specific operation is executed, determines a type of interchangeable lens mounted on the lens mount, and controls, when the specific operation is executed, switching the focus adjustment position to a position registered based on a determined type of mounted interchangeable lens regardless of the focus adjustment position before switching.

Further features will become apparent from the following description of exemplary embodiments with reference to the attached drawings.

BRIEF DESCRIPTION OF THE DRAWINGS

FIGS. 3A and 3B are a flowchart illustrating an example of switching processing of an autofocus (AF) range-finding point.

DESCRIPTION OF THE EMBODIMENTS

An exemplary embodiment of the present disclosure will be described in detail below with reference to the accompanying drawings.

It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

In the first exemplary embodiment, a digital camera 100 (hereinafter, referred to as "camera 100") serving as an imaging apparatus will be described.

Figure 1A:
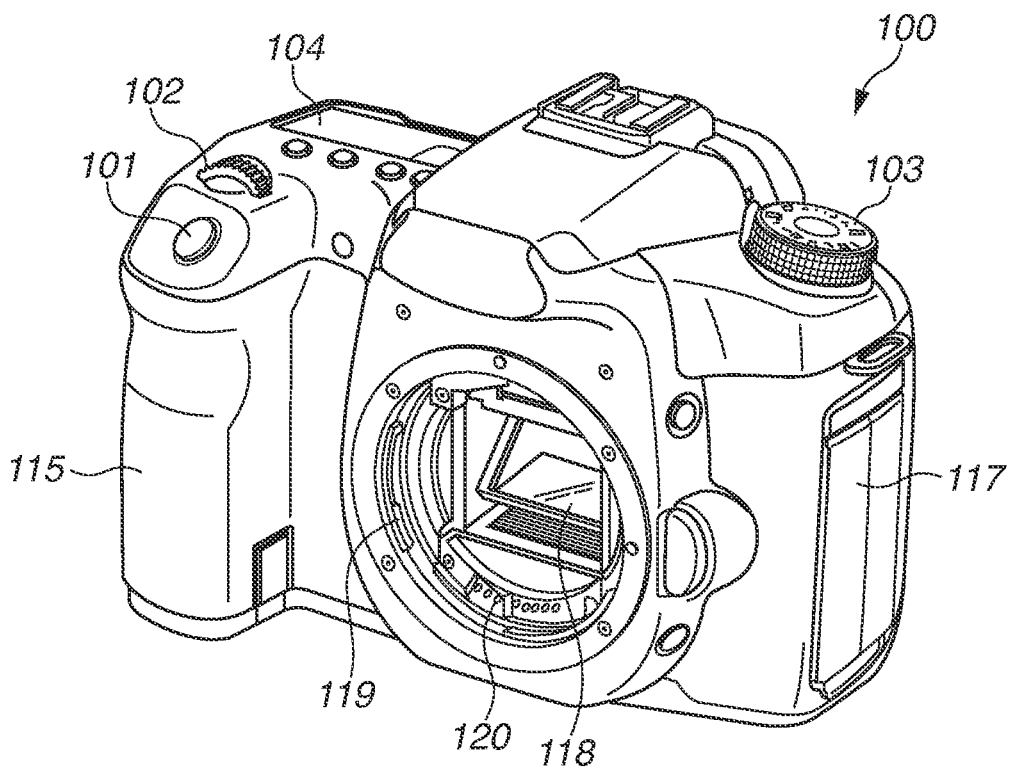
FIGS. 1A and 1B are diagrams illustrating an example of an external configuration of a digital camera.
Figure 1B:
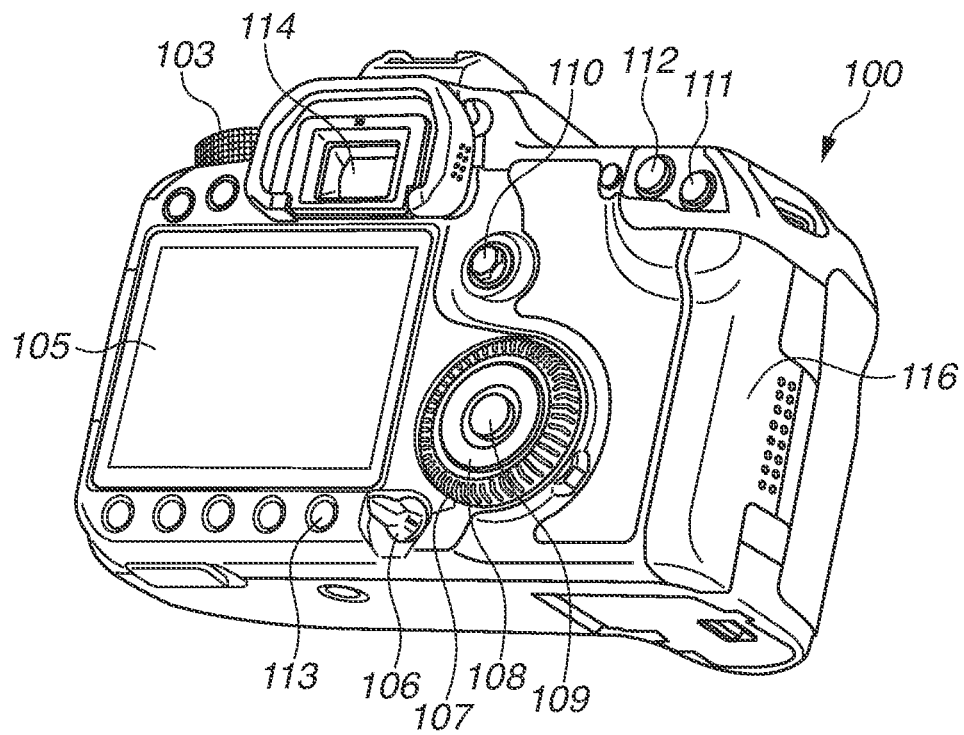

FIGS. 1A and 1B are diagrams illustrating an example of an external view of the camera 100. FIG. 1A illustrates a front face perspective view of the camera 100, whereas FIG. 1B illustrates a rear face perspective view of the camera 100.

The camera 100 includes a shutter button 101, a main electronic dial 102, a mode shifting switch 103, and an extra-finder display unit 104 disposed on an upper face thereof. The shutter button 101 is an operation unit for inputting an imaging preparation instruction or an imaging instruction. The main electronic dial 102 is a rotary operation unit for changing a setting value of a shutter speed or an aperture. The mode shifting switch 103 is an operation unit for shifting various modes. A mode can be shifted to a still image capturing mode or a moving image capturing mode via the mode shifting switch 103. The extra-finder display unit 104 displays various setting values of a shutter speed, an aperture, and the like.

The camera 100 includes a display unit 105, a power switch 106, a sub-electronic dial 107, a cross key 108, a set button 109, and a live view button 110 disposed on a rear face thereof. The camera 100 also includes an enlargement button 111, a reduction button 112, a reproduction button 113, and a finder 114.

The display unit 105 displays images and information of various types. The display unit 105 is an example of a display unit. The display unit 105 displays a live view image, a quick-review image captured by a still image capturing operation, or a moving image being captured by a moving image capturing operation. The power switch 106 is an operation unit for switching a power-on state and a power-off state of the camera 100. The sub-electronic dial 107 is a rotary operation unit for moving a selection frame or feeding the images. The cross key 108 is a four-direction key that can be pressed in the up, down, right, and left directions, and an operation based on a pressed position can be executed. The set button 109 is an operation unit that is pressed when the user determines a selected item.

The live view button 110 is an operation unit that switches a view-finder imaging mode and a live view imaging mode in the still image capturing mode, and provides an instruction for starting or stopping the moving image capturing (recording) operation in the moving image capturing mode. The enlargement button 111 is an operation unit that turns on and off the enlargement mode when a live view image is displayed, and changes a magnification rate of the enlargement mode. The enlargement button 111 is used for increasing a magnification rate of an image reproduced in the reproduction mode. The reduction button 112 is an operation unit that reduces a magnification rate of an enlarged reproduction image to reduce the displayed image. The reproduction button 113 is a button for switching the imaging mode and the reproduction mode. The mode is switched to the reproduction mode when the reproduction button 113 is pressed in the still image capturing mode or the moving image capturing mode, and a latest image from among images stored in a storage medium is displayed at the display unit 105. The finder 114 is a view-type finder that enables a user to observe the below-described focusing screen to check a focal point or a composition of an optical image of an object.

A grip portion 115 and a cover portion 116 are provided on a right side of the camera 100, and a terminal cover 117 is provided on a left side. The grip portion 115 is a holding portion formed into a shape that can be easily grasped with the right hand when the user holds the camera 100. The cover portion 116 is a cover for closing a slot that stores a storage medium. The terminal cover 117 is a cover for protecting a connector to which a connection cable of an external device is connected.

A quick return mirror 118 that is moved up and down by an actuator is disposed inside the camera 100. The camera 100 also includes a lens mount 119 on which a lens unit as an interchangeable lens is mounted and a communication terminal 120 for communicating with the lens unit.

Figure 2:
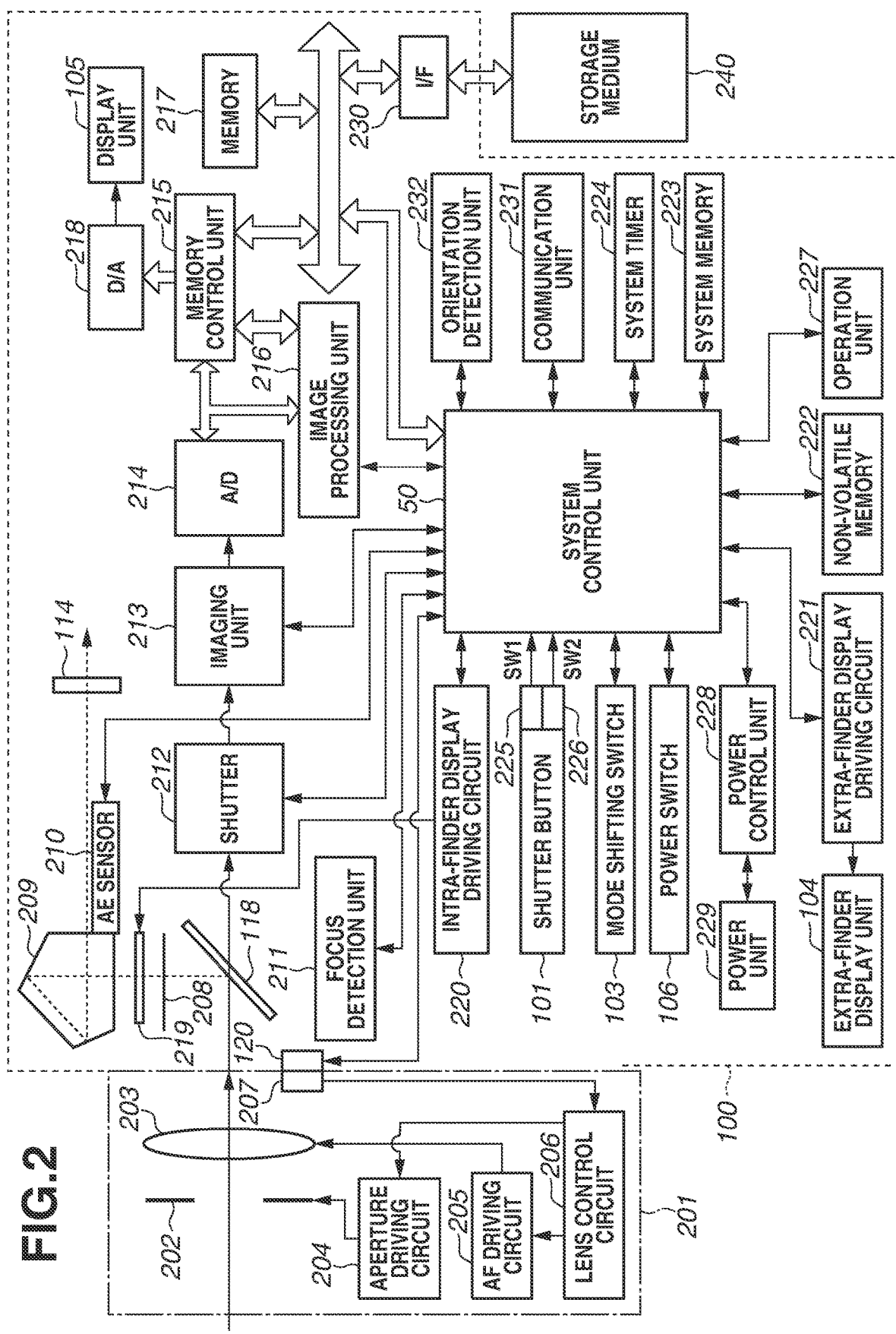
FIG. 2 is a block diagram illustrating an example of an internal configuration of the digital camera.

FIG. 2 is a block diagram illustrating an example of a configuration of the camera 100. The same reference numerals are applied to the constituent elements similar to those illustrated in FIGS. 1A and 1B, and descriptions thereof will be omitted as appropriate. A detachable lens unit 201 as an interchangeable lens is mounted on the camera 100.

The lens unit 201 includes an aperture 202, a lens group 203, an aperture driving circuit 204, an autofocus (AF) driving circuit 205, a lens control circuit 206, and a communication terminal 207. An opening size of the aperture 202 is adjustable. The lens group 203 is configured of a plurality of lenses. The aperture driving circuit 204 controls the opening size of the aperture 202 to adjust a light amount. The AF driving circuit 205 drives the lens group 203 to adjust a focal point.

The lens control circuit 206 controls the aperture driving circuit 204 and the AF driving circuit 205 based on the instruction of a system control unit 50 described below. The lens control circuit 206 controls the aperture 202 via the aperture control circuit 204, and adjusts a focal point by displacing the position of the lens group 203 via the AF driving circuit 205. The lens control circuit 206 can communicate with the camera 100. Specifically, communication is executed via the communication terminal 207 of the lens unit 201 and the communication terminal 120 of the camera 100.

The camera 100 includes the quick return mirror 118, a focusing screen 208, a pentaprism 209, an auto-exposure (AE) sensor 210, a focus detection unit 211, the finder 114, a shutter 212, an imaging unit 213, and the system control unit 50.

The quick return mirror 118 (hereinafter, referred to as "mirror 118") is moved up and down through an actuator based on an instruction of the system control unit 50 when an operation such as an exposure control operation, a live view image display operation, or a moving image capturing operation is to be executed. The mirror 118 switches a light flux having entered it from the lens group 203 to a side of the finder 114 or the imaging unit 213. Normally, the mirror 118 is arranged to guide the light flux to a side of the finder 114. When an image capturing operation or a live view image display operation is to be executed, the mirror 118 is flipped upward ("mirror-up") so that the light flux is guided to the imaging unit 213. A central portion of the mirror 118 is configured of a half mirror that transmits a part of the light flux so that a part of the light flux passing through is incident on the focus detection unit 211 for executing focus detection.

The AE sensor 210 measures luminance of object light passing through the lens unit 201. The focus detection unit 211 detects a defocus amount based on the light flux passing through the mirror 118. The system control unit 50 controls the lens unit 201 based on the defocus amount to execute phase difference autofocus. The user can check the focal point or the composition of the optical image of the object acquired through the lens unit 201 by observing the focusing screen 208 via the pentaprism 209 and the finder 114. The shutter 212 is a focal-plane shutter that freely controls the exposure time of the imaging unit 213 based on an instruction of the system control unit 50. The imaging unit 213 is an image sensor configured of a charge coupled device (CCD) sensor or a complementary metal oxide semiconductor (CMOS) sensor that converts an optical image into an electric signal.

The camera 100 also includes an analog-to-digital (A/D) conversion unit 214, a memory control unit 215, an image processing unit 216, a memory 217, a digital-to-analog (D/A) conversion unit 218, and a display unit 105. The A/D conversion unit 214 converts an analog signal output from the imaging unit 213 into a digital signal. With respect to the image data received from the AD conversion unit 214 or the memory control unit 215, the image processing unit 216 executes predetermined pixel interpolation or reduction through resizing processing or color conversion processing.

The image processing unit 216 uses captured image data to execute predetermined arithmetic processing so that the system control unit 50 executes exposure control or range-finding control based on the acquired arithmetic result. AF processing, AE processing, or pre-flash (EF) processing employing a through-the-lens (TTL) method is executed using the above-described processing. The image processing unit 216 uses captured image data to execute predetermined arithmetic processing, and executes auto-white balance (AWB) processing employing the TTL method based on the acquired arithmetic result.

The image data transmitted from the A/D conversion unit 214 is written into the memory 217 via the image processing unit 216 and the memory control unit 215, or directly written into the memory 217 via the memory control unit 215. The memory 217 stores image data acquired by the imaging unit 213 and converted into digital data by the A/D conversion unit 214 and image data to be displayed at the display unit 105. The memory 217 has storage capacity sufficient for storing a predetermined number of still images or a predetermined period of moving images or audio data. The memory 217 also serves as a memory (video memory) for displaying images.

The D/A conversion unit 218 converts display image data stored in the memory 217 into an analog signal and supplies the converted image data to the display unit 105. Accordingly, the display image data written into the memory 217 is displayed at the display unit 105 via the D/A conversion unit 218. The display unit 105 displays data on a display device such as a liquid crystal display (LCD) based on the analog signal supplied from the D/A conversion unit 218. The digital signal that has been converted by the A/D conversion unit 214 and stored in the memory 217 is converted into an analog signal by the D/A conversion unit 218 and sequentially transmitted to and displayed at the display unit 105 so that the display unit 105 functions as an electronic view finder that executes live view image display (camera-through display).

The camera 100 includes an intra-finder display unit 219, an intra-finder display driving circuit 220, an extra finder display unit 104, an extra-finder display driving circuit 221, a non-volatile memory 222, a system memory 223, and a system timer 224. The intra-finder display unit 219 displays a frame indicating a position where autofocusing is currently executed or an icon expressing a setting state of the camera 100, via the intra-finder display driving circuit 220. The extra-finder display unit 104 displays a setting value of a shutter speed, an aperture, or the like via the extra-finder display driving circuit 221. The non-volatile memory 222 is an electrically erasable/recordable memory such as an electrically erasable programmable read only memory (EEPROM). The non-volatile memory 222 stores a constant number, a program, or a threshold value for executing an operation of the system control unit 50. The program is a program for executing processing described below.

For example, a random access memory (RAM) is used as the system memory 223. A constant number or a variable number used for an operation of the system control unit 50 or a program read from the non-volatile memory 222 is loaded into the system memory 223. The system timer 224 is a timer unit that measures time used for various control processing or time of a built-in clock.

The system control unit 50 includes at least one processor and controls the camera 100. The system control unit 50 executes the program stored in the above-described non-volatile memory 222 to realize various types of processing described below. The system control unit 50 controls the memory 217, the D/A conversion unit 218, and the display unit 105 to execute display control. The system control unit 50 corresponds to an example of a registration unit, a determination unit, or a control unit.

The camera 100 includes operation units such as the mode shifting switch 103, a first shutter switch 225, a second shutter switch 226, and an operation unit 227 for inputting various operation instructions to the system control unit 50.

The mode shifting switch 103 is an operation unit for shifting a mode to the still image capturing mode, the moving image capturing mode, or the reproduction mode. The system control unit 50 sets the mode shifted by the mode shifting switch 103. An auto-imaging mode, an auto-scene determination mode, a manual mode, an aperture priority mode (Av mode), and a shutter speed priority mode (Tv mode) are the modes included in the still image capturing mode. Various scene modes for executing the imaging settings of different imaging scenes, a program AE mode, and a custom mode are also provided. A mode can be directly shifted to any one of the above-described modes using the mode shifting switch 103. After switching to a menu button is performed using the mode shifting switch 103, a mode can be shifted to any one of the above-described modes included in the menu button via another operation unit. Similarly, a plurality of modes can be included in the moving image capturing mode.

When the shutter button 101 is operated halfway through and brought into a so-called half-pressed state where an imaging preparation instruction is given thereto, the first shutter switch 225 is turned on and generates a first shutter switch signal SW1. The system control unit 50 starts the processing such as AF processing, AE processing, AWB processing, or EF processing through the first shutter switch signal SW1.

When the shutter button 101 is completely operated and brought into a so-called fully-pressed state where an imaging instruction is given thereto, the second shutter switch 226 is turned on and generates a second shutter switch signal SW2. By receiving the second shutter switch signal SW2, the system control unit 50 starts executing a series of imaging processing from the operation of reading out a signal from the imaging unit 213 to the operation of writing image data into the storage medium 240.

The operation unit 227 is a member serving as an input unit for receiving a user operation to execute various operations. When the user selects and operates various function icons displayed at the display unit 105, functions are allocated to the operation unit 227 as appropriate based on the situation, so that the operation unit 227 operates as various function buttons. For example, an end button, a return button, an image feeding button, a jump button, a narrowing-down button, and an attribute changing button are provided as the function buttons. For example, a menu screen that enables a user to perform various settings is displayed at the display unit 105 when the menu button is pressed. The user can intuitively perform various settings by operating the menu screen displayed at the display unit 105, the cross key 108, and the set button 109. For example, the operation unit 227 includes the shutter button 101, the main electronic dial 102, the power switch 106, the sub-electronic dial 107, the cross key 108, and the set button 109. For example, the operation unit 227 includes the live view button 110, the enlargement button 111, the reduction button 112, and the reproduction button 113.

The camera 100 includes a power control unit 228, a power unit 229, a storage medium interface (I/F) 230, a communication unit 231, and an orientation detection unit 232. The power control unit 228 consists of a battery detection circuit, a direct current-to-direct current (DC-DC) converter, and a switch circuit for switching a block to be energized, and detects the presence/absence of a battery mounted thereon, a battery type, and a remaining battery level. Based on the detection result and an instruction received from the system control unit 50, the power control unit 228 controls the DC-DC converter to supply necessary voltage to respective units including the storage medium 240 for a necessary period of time. The power unit 229 consists of a primary battery such as an alkaline battery or a lithium battery, a secondary battery such as a nickel-cadmium (NiCd) battery, a nickel-metal hydride (NiMH) battery, or a lithium-ion (Li) battery, or an alternating-current (AC) adapter. The storage medium OF 230 serves as an interface between the camera 100 and the storage medium 240 such as a memory card or a hard disk. The storage medium 240 is a storage medium such as a memory card for storing a captured image, which consists of a semiconductor memory or a magnetic disk. The communication unit 231 connects the camera 100 to an external device wirelessly or through a cable, and transmits or receives a video signal or an audio signal. The communication unit 231 can transmit an image including a live view image captured by the imaging unit 213 or an image stored in the storage medium 240 and receive image data or various types of information from the external device. In addition, the communication unit 231 can connect to a wireless local area network (LAN) or the internet.

The orientation detection unit 232 detects the orientation of the camera 100 in a gravitational direction. Based on the orientation detected by the orientation detection unit 232, the system control unit 50 can determine whether an image captured by the imaging unit 213 is an image captured when the camera 100 is held laterally or longitudinally. In addition, the system control unit 50 can attach orientation information based on the orientation detected by the orientation detection unit 232 to the image data captured by the imaging unit 213, or can rotate and store the image. An acceleration sensor or a gyroscope can be used as the orientation detection unit 232.

Figure 3B:
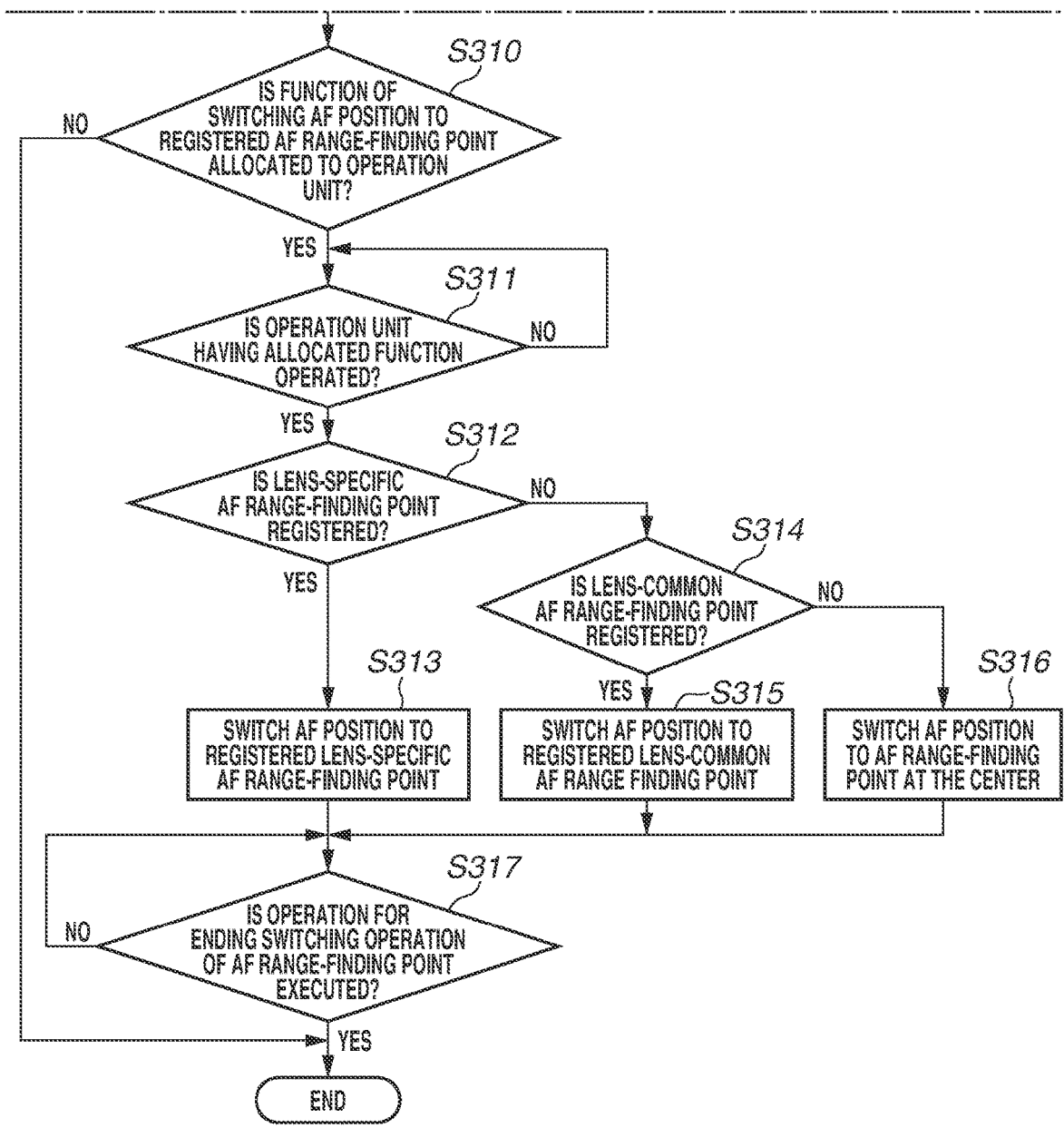
Figure 4A:
FIGS. 4A and 4B are a flowchart illustrating an example of registration processing of an AF range-finding point.
Figure 4A:
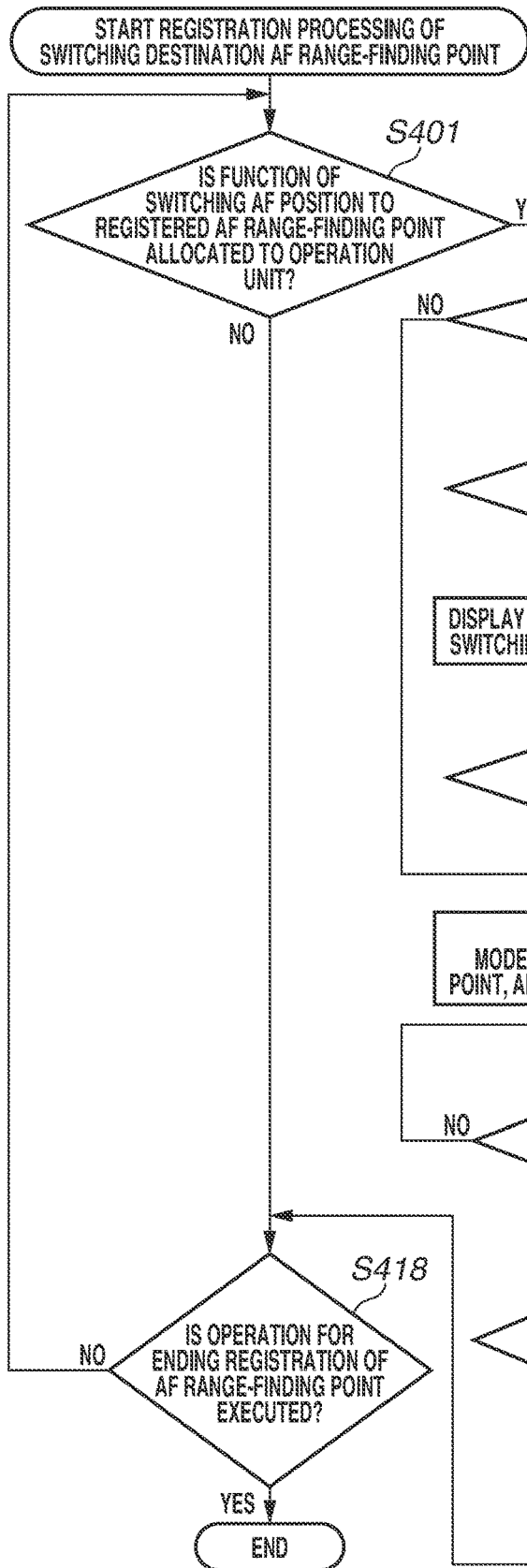
Figure 4B:
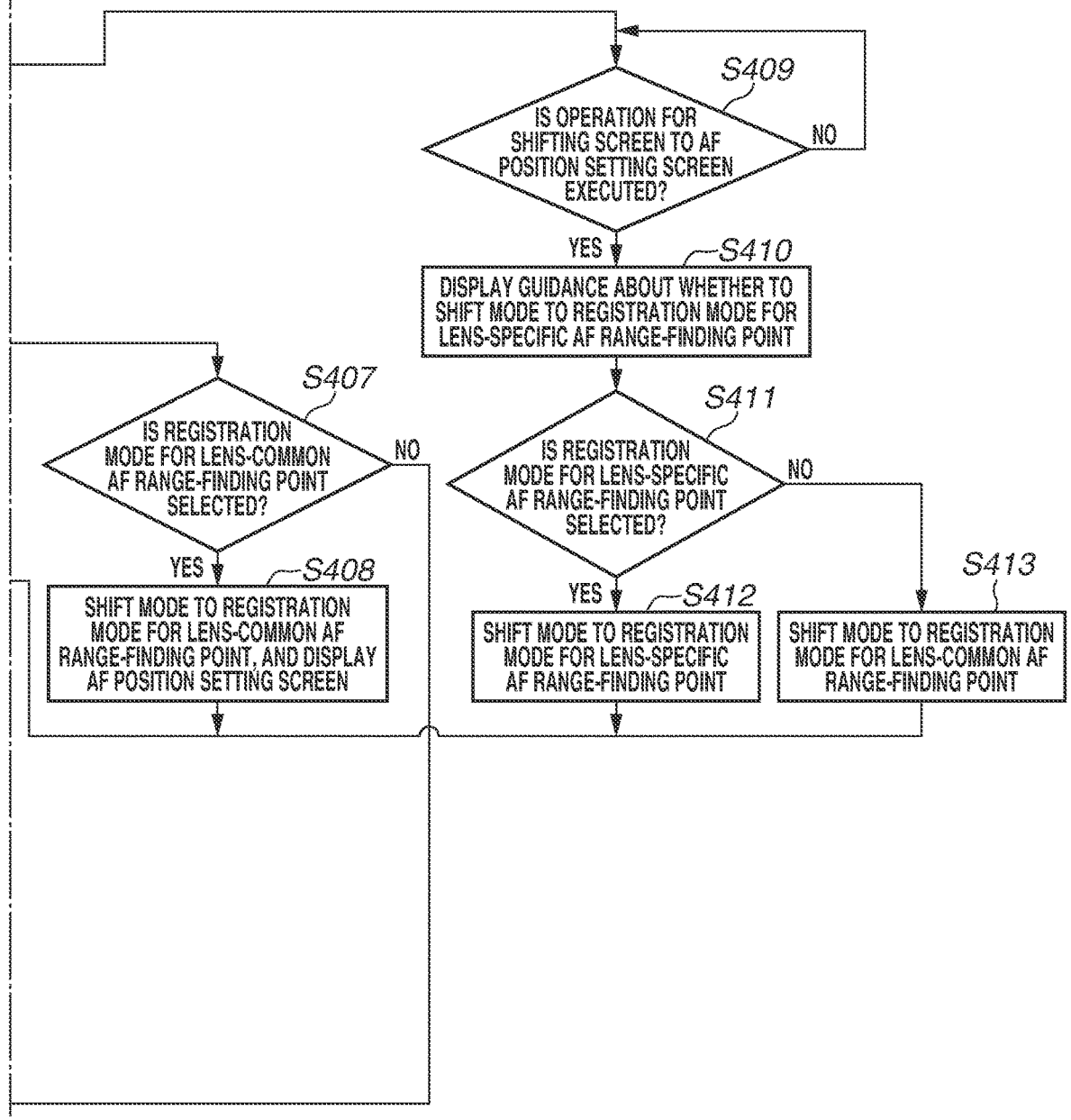

Next, processing executed by the camera 100 according to the present exemplary embodiment will be described with reference to the flowcharts in FIGS. 3A and 3B and FIGS. 4A and 4B. FIGS. 3A and 3B illustrate an example of processing for registering an AF range-finding point and switching a position for executing autofocusing to a registered AF range-finding point according to a mounted lens unit. The system control unit 50 loads a program stored in the non-volatile memory 222 onto the system memory 223 and executes the program to realize the flowchart in FIGS. 3A and 3B. The flowchart in FIGS. 3A and 3B starts when a power of the camera 100 is turned on.

In step S301, the system control unit 50 determines whether the lens unit 201 is mounted on the lens mount 119 of the camera 100. If the lens unit 201 is mounted (YES in step S301), the processing proceeds to step S302. If the lens unit 201 is not mounted (NO in step S301), the system control unit 50 waits until the lens unit 201 is mounted.

In step S302, the system control unit 50 acquires a lens identification (ID) as identification information for specifying the mounted lens unit 201. Specifically, the system control unit 50 acquires the lens ID from the lens control circuit 206 of the lens unit 201 via the communication terminals 207 and 120. The processing corresponds to an example of processing executed by a determination unit that determines a type of the lens unit 201.

In step S303, with respect to the lens unit 201 mounted thereon, the system control unit 50 determines whether to limit the AF range-finding points. Specifically, the system control unit 50 determines whether to limit the AF range-finding points based on the acquired lens ID. For example, information about a lens ID indicating limitation on the range-finding points is stored in the non-volatile memory 222. If the AF range-finding points should be limited (YES in step S303) the processing proceeds to step S304. If the AF range-finding points do not have to be limited (NO in step S303), the processing proceeds to step S305.

In step S304, the system control unit 50 limits the AF range-finding points to usable AF range-finding points. The non-volatile memory 222 stores information about limitation on AF range-finding points in association with the lens IDs. The processing is executed in order to limit the AF range-finding point at which sufficient AF performance cannot be realized because of the characteristic (e.g., F-value) such as an amount of light entering thereto, which is unique to the lens unit 201. For example, in a case where a lens unit having a greater F-value is mounted, a number of usable AF range-finding points becomes smaller than in a case where a lens unit having a smaller F-value is mounted thereon.

Figure 5:
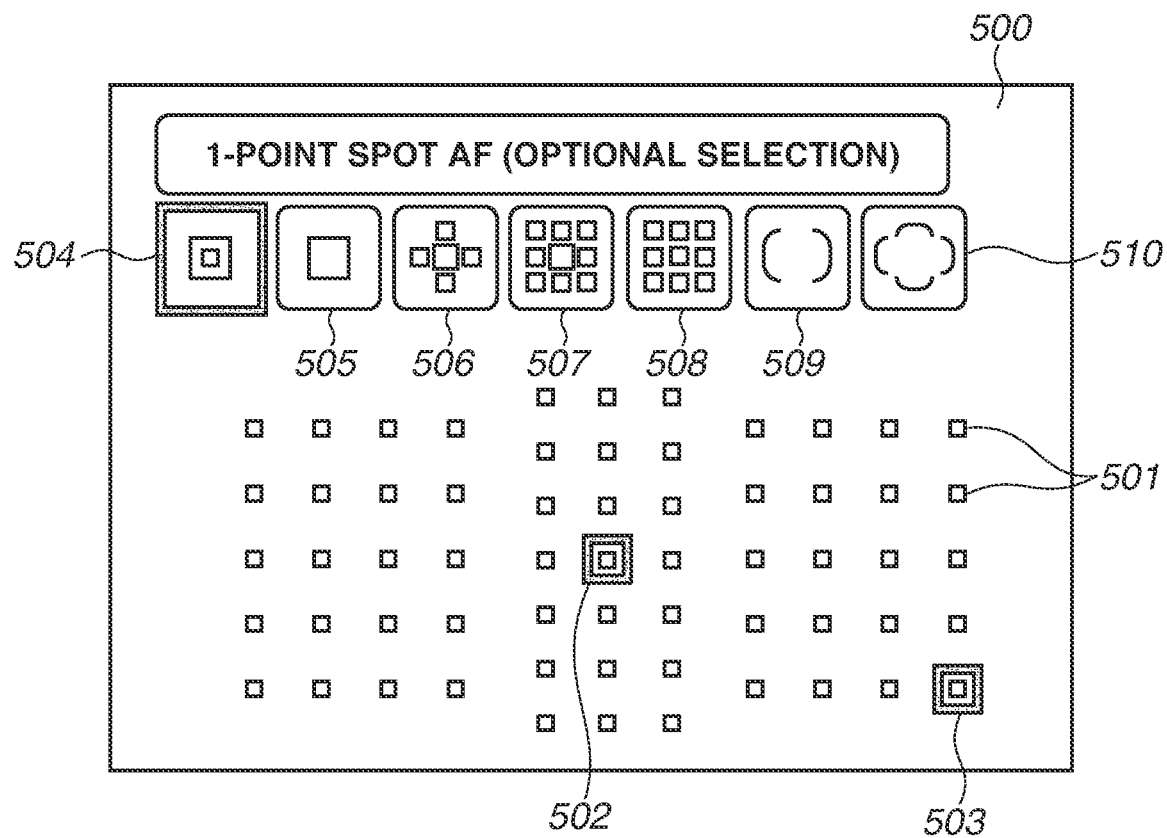
FIG. 5 is a diagram illustrating an example of an AF position setting screen.

FIG. 5 is a diagram illustrating an example of an AF position setting screen displayed at the display unit 105.

An AF position setting screen 500 is a setting screen before the AF range-finding points are limited.

A plurality of AF range-finding points 501 (e.g., 61 points) is displayed on the AF position setting screen 500. Each of the AF range-finding points 501 is represented by a rectangular shape. A frame 502 is positioned at one of the AF range-finding points 501 to indicate a current AF position (focus adjustment position). A frame 503 indicates an AF range-finding point registered as a switching destination described below. A display method for indicating the AF position is not limited to the frame 502, and any display method can be used as long as the user can identify the AF position. For example, the AF range-finding point 501 as an AF point can be displayed in a color different from a color used for the other AF range-finding points 501.

FIG. 5 illustrates an example of the AF range-finding point 501 when the user has selected a 1-point spot AF icon 504 in order to focus on one point narrower than a normal focal area. The user can select a normal 1-point AF icon 505, an expanded area AF icon 506, an expanded peripheral area AF icon 507, a zone AF icon 508, a large zone AF icon 509, and an auto-selection AF icon 510 based on a range (area) where autofocusing is to be executed.

Figure 6:
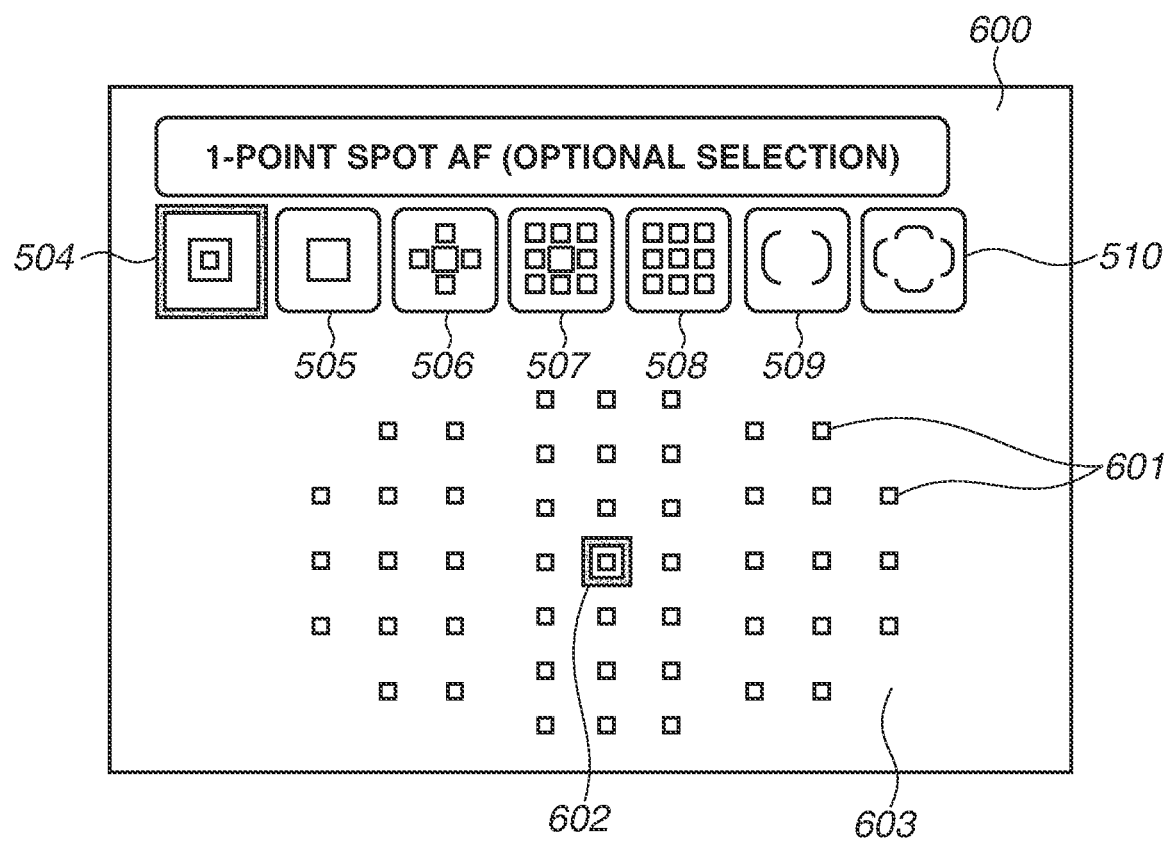
FIG. 6 is a diagram illustrating an example of an AF position setting screen.

FIG. 6 is a diagram illustrating an example of an AF position setting screen 600 displayed at the display unit 105. The same reference numerals are applied to the elements similar to those in FIG. 5.

The AF position setting screen 600 is a setting screen displayed after the AF range-finding points are limited.

In the AF position setting screen 600, the AF range-finding points 601 (e.g., 47 points) less than the AF range-finding points 501 in the AF position setting screen 500 in FIG. 5 are displayed. A frame 602 is positioned at one of the AF range-finding points 601, and indicates a current AF position. A position 603 is a position of the AF range-finding point that cannot be used because of the limitation on the AF range-finding points. In FIG. 6, from among the sixty-one AF range-finding points 501 in FIG. 5, fourteen AF range-finding points 501 arranged on the right and the left sides are not usable. Therefore, the AF range-finding points are limited to forty-seven points.

In step S305, the system control unit 50 determines whether a lens-specific AF range-finding point corresponding to the mounted lens unit 201 is registered. Specifically, the system control unit 50 determines whether information about the lens-specific AF range-finding point is stored in the non-volatile memory 222 in association with the lens ID of the lens unit 201. Herein, the lens-specific AF range-finding point refers to a specific AF range-finding point corresponding to the type of lens unit 201. The user can register the AF range-finding point of a position where the user performs autofocusing relatively frequently as the lens-specific AF range-finding point at each lens unit 201. Processing for registering the lens-specific AF range-finding point will be described below with reference to the flowchart in FIGS. 4A and 4B. If the lens-specific AF range-finding point is registered (YES in step S305), the processing proceeds to step S306. If the lens-specific AF range-finding point is not registered (NO in step S305), the processing proceeds to step S307.

In step S306, the system control unit 50 reads out the lens-specific AF range-finding point corresponding to the mounted lens unit 201. Specifically, the system control unit 50 reads out the information about the lens-specific AF range-finding point associated with the lens ID of the lens unit 201 from the non-volatile memory 222 to the system memory 223.

In step S307, the system control unit 50 determines whether a lens-common AF range-finding point is registered. Specifically, the system control unit 50 determines whether information about the lens-common AF range-finding point is stored in the non-volatile memory 222. Herein, the lens-common AF range-finding point refers to an AF range-finding point common to a plurality of types of lens unit 201. The user can register, as the lens-common AF range-finding point, an AF range-finding point of a position, where autofocusing is executed, common to the plurality of lens units 201. The processing for registering the lens-common AF range-finding point will be described below with reference to the flowchart in FIGS. 4A and 4B. If the lens-common AF range-finding point is registered (YES in step S307), the processing proceeds to step S308. If the lens-common AF range-finding point is not registered (NO in step S307), the processing proceeds to step S309.

In step S308, the system control unit 50 reads out the lens-common AF range-finding point. Specifically, the system control unit 50 reads out the information about the lens-common AF range-finding point from the non-volatile memory 222 to the system memory 223.

The processing in step S309 is processing for registering the AF range-finding point as a switching destination. The processing will be described with reference to the flowchart in FIGS. 4A and 4B. The system control unit 50 loads a program stored in the non-volatile memory 222 into the system memory 223 and executes the program to realize the flowchart in FIGS. 4A and 4B.

In step S401, the system control unit 50 determines whether a function of switching the AF position to the registered AF range-finding point is allocated to any one of the operation members of the operation unit 227. Based on the operation performed by the user, the system control unit 50 can previously allocate a function of switching the AF position to the registered AF range-finding point to any one of the operation members of the operation unit 227. In addition, an operation member of the operation unit 227 to which the above-described function is allocated does not have to be a physical operation member, but can be a touchable item displayed at the display unit 105. If the function of switching the AF execution position to the registered AF range-finding point is allocated to any one of the operation members of the operation unit 227 (YES in step S401), the processing proceeds to step S402. If the function is not allocated (NO in step S401), the processing proceeds to step S418.

In step S402, the system control unit 50 determines whether a switchable AF range-finding point is registered. The switchable AF range-finding point can be the lens-specific AF range-finding points or the lens-common AF range-finding points. Specifically, the system control unit 50 determines that the switchable AF range-finding point is registered if the AF range-finding point is read out in step S306 or S308. However, even if the lens-common AF range-finding point is read out in step S308, the AF range-finding point cannot be switched if the read lens-common AF range-finding point has been limited in step S304. Therefore, in this case, the system control unit 50 determines that the switchable AF range-finding point is not registered.

If the switchable AF range-finding point is registered (YES in step S402), the processing proceeds to step S403. If the switchable AF range-finding point is not registered (NO in step S402), the processing proceeds to step S406. However, the processing can proceed to step S404 if the switchable AF range-finding point is not registered.

In step S403, the system control unit 50 determines whether the lens unit 201 is mounted on the camera 100 in a state where the imaging stand-by screen is displayed. If the lens unit 201 is mounted in a state where the imaging stand-by screen is displayed (YES in step S403), the processing proceeds to step S404. If the lens unit 201 is mounted in a state other than the state where the imaging stand-by screen is displayed (NO in step S403), the processing proceeds to step S409.

In step S404, the system control unit 50 causes the display unit 105 to display guidance about whether to register the switching destination AF range-finding point. The processing is executed after the system control unit 50 determines that the lens unit 201 is mounted in step S301. Therefore, it is assumed that the user would like to register the AF range-finding point if the lens unit 201 is mounted thereon. For example, in a state where the imaging stand-by screen is displayed, it is assumed that the user would like to register the AF range-finding point while checking the live view image. As described above, by displaying guidance for checking whether to register the AF range-finding point at the timing of step S404, the user can recognize that the AF range-finding point can be registered and promptly shift the operation to the operation for registering the AF range-finding point.

Figure 7:
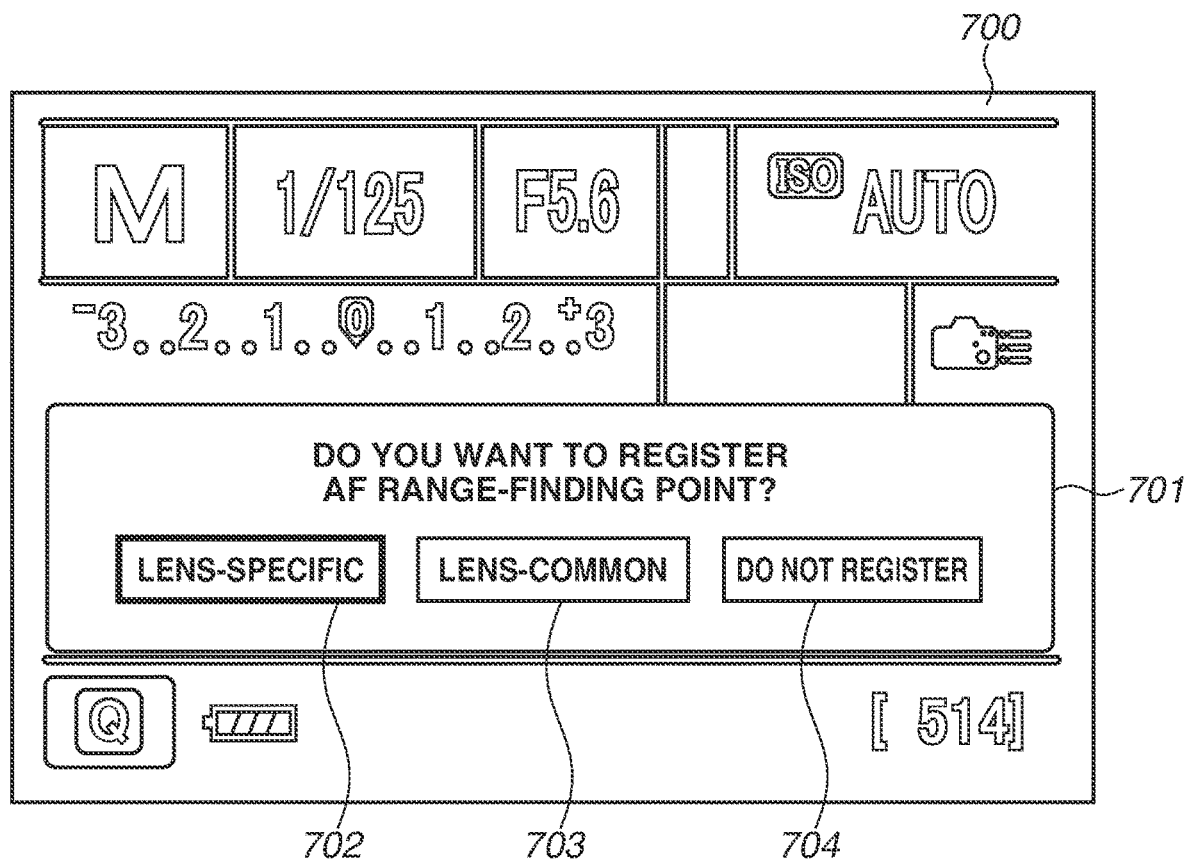
FIG. 7 is a diagram illustrating an example of an imaging stand-by screen.

FIG. 7 is a diagram illustrating an example of an imaging stand-by screen 700 including guidance about registration of the AF range-finding point as a switching destination.

A guidance 701 is displayed on the imaging stand-by screen 700. Selection items 702 to 704 are displayed on the guidance 701. The selection item 702 is a button selected when the lens-specific AF range-finding point is to be registered. The selection item 703 is a button selected when the lens-common AF range-finding point is to be registered. The selection item 704 is a button selected when the AF range-finding point is not registered. The user can operate the operation unit 227 to select any one of the selection items 702 to 704.

In step S405, the system control unit 50 determines whether a registration mode for the lens-specific AF range-finding point is selected. The registration mode for the lens-specific AF range-finding point refers to a mode for registering the lens-specific AF range-finding point corresponding to the type of mounted lens unit 201. Specifically, when the selection item 702 in FIG. 7 is selected, the system control unit 50 determines that the registration mode for the lens-specific AF range-finding point is selected. If the registration mode for the lens-specific AF range-finding point is selected (YES in step S405), the processing proceeds to step S406. If the registration mode for the lens-specific AF range-finding point is not selected (NO in step S405), the processing proceeds to step S407.

In step S406, the system control unit 50 shifts a mode to the registration mode for the lens-specific AF range-finding point and displays the AF position setting screen. Specifically, the system control unit 50 displays the AF position setting screen 500 in FIG. 5. At this time, the system control unit 50 displays only usable AF range-finding points if the AF range-finding points are limited to the usable AF range-finding points in step S302. In other words, the AF position setting screen 600 in FIG. 6 is displayed, and thus the lens-specific AF range-finding points are limited to registerable lens-specific AF range-finding points. The system control unit 50 stores the information about the shifted registration mode in the system memory 223.

In step S407, the system control unit 50 determines whether the registration mode for the lens-common AF range-finding point is selected. The registration mode for the lens-common AF range-finding point refers to a mode for registering the lens-common AF range-finding point corresponding to a plurality of types of lens unit 201 regardless of the type of the lens unit 201 mounted thereon. Specifically, the system control unit 50 determines that the registration mode for the lens-common AF range-finding point is selected when the selection item 703 in FIG. 7 is selected. If the registration mode for the lens-common AF range-finding point is selected (YES in step S407), the processing proceeds to step S408. If the selection item 704 in FIG. 7 is selected, so that the registration mode for the lens-common AF range-finding point is not selected (NO in step S407), this corresponds to a case where the user has selected not to register the AF range-finding point. Therefore, the processing proceeds to step S418.

In step S408, the system control unit 50 shifts a mode to the registration mode for the lens-common AF range-finding point and displays the AF position setting screen. Specifically, even if the AF range-finding points are limited to the usable AF range-finding points in step S303 as described above, the system control unit 50 displays all of the AF range-finding points as illustrated in the AF position setting screen 500 in FIG. 5. However, it is preferable that a part of the AF range-finding points, to which the AF position of the mounted lens unit 201 cannot be switched, be identifiably displayed to the user. The system control unit 50 stores the information about the shifted registration mode in the system memory 223.

If the processing proceeds to step S409 from step S403, the system control unit 50 determines whether an operation for shifting a screen to the AF position setting screen is executed by the user. Specifically, the system control unit 50 determines that an operation for shifting a screen to the AF position setting screen is executed when an AF position setting is selected from a setting menu via the operation unit 227 by the user. In addition, the operation for shifting a screen to the AF position setting screen can be executed by pressing a button to which an instruction for shifting a screen to the AF position setting screen is allocated. If the operation for shifting a screen to the AF position setting screen is executed (YES in step S409), the processing proceeds to step S410. If the operation for shifting a screen to the AF position setting screen is not executed (NO in step S409), the system control unit 50 waits for the operation.

In step S410, the system control unit 50 displays the AF position setting screen and displays guidance about whether to shift a mode to the registration mode for lens-specific AF range-finding point. In other words, as it is assumed that the user would like to register either the lens-specific AF range-finding point or the lens-common AF range-finding point, the system control unit 50 displays guidance for asking the user for confirmation.

Figure 8:
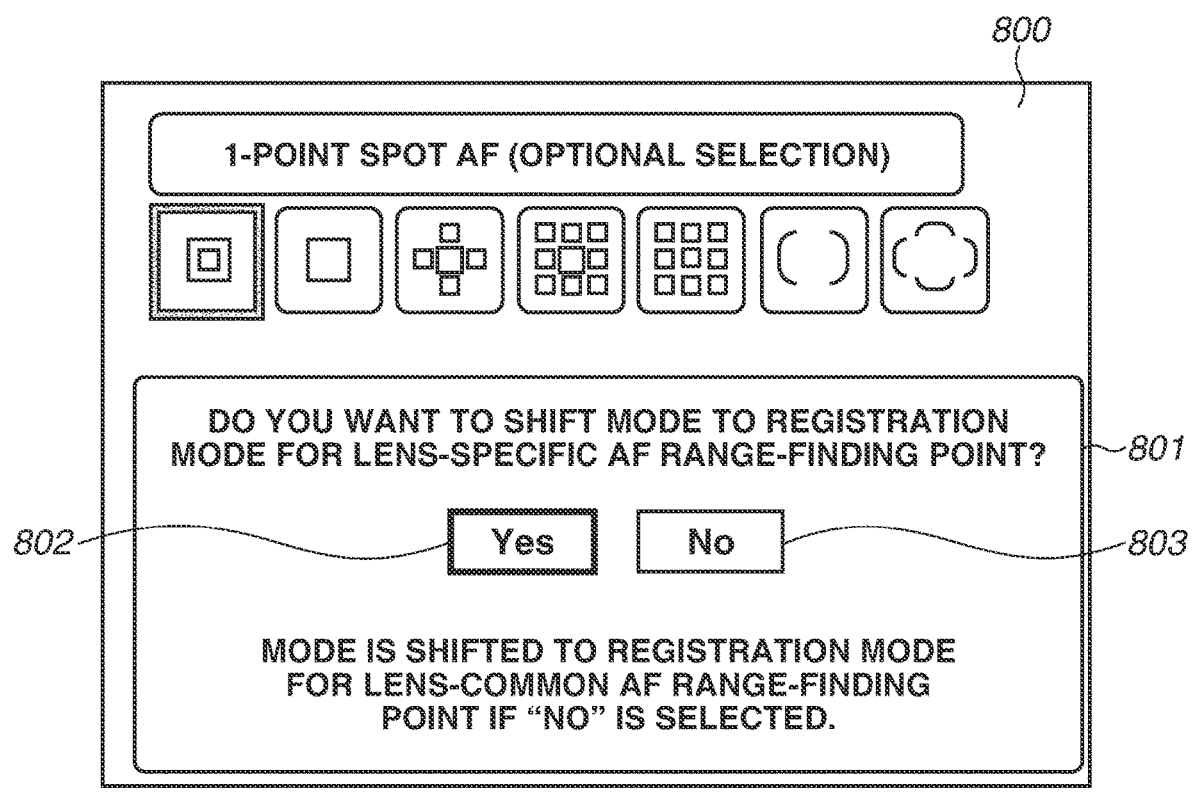
FIG. 8 is a diagram illustrating an example of an AF position setting screen.

FIG. 8 is a diagram illustrating an example of an AF position setting screen 800 including guidance about whether to shift a mode to the lens-specific AF range-finding point registration mode.

A guidance 801 is displayed on the AF position setting screen 800. The guidance 801 includes selection items 802 and 803. The selection item 802 is a button selected when a mode is to be shifted to the registration mode for a lens-specific AF range-finding point. The selection item 803 is a button selected when a mode is to be shifted to the registration mode for a lens-common AF range-finding point. The user can select any one of the selection items 802 and 803 via the operation unit 227.

In step S411, the system control unit 50 determines whether the registration mode for the lens-specific AF range-finding point is selected. Specifically, when the selection item 802 in FIG. 8 is selected, the system control unit 50 determines that the registration mode for the lens-specific AF range-finding point is selected. If the registration mode for the lens-specific AF range-finding point is selected (YES in step S411), the processing proceeds to step S412. If the selection item 803 in FIG. 8 is selected, so that the registration mode for the lens-specific AF range-finding point is not selected (NO in step S411), this corresponds to a case where the registration mode for the lens-common AF range-finding point is selected. Therefore, the processing proceeds to step S413.

In step S412, the system control unit 50 shifts a mode to the registration mode for the lens-specific AF range-finding point. The processing is similar to the processing in step S406. The system control unit 50 stores the information about the shifted registration mode in the system memory 223.

In step S413, the system control unit 50 shifts a mode to the registration mode for the lens-common AF range-finding point. The processing is similar to the processing in step S408. The system control unit 50 stores the information about the shifted registration mode in the system memory 223.

In step S414, the system control unit 50 determines whether an operation for registering the AF range-finding point is executed by the user. Specifically, the system control unit 50 determines that the operation for registering the AF range-finding point is executed when the user selects an AF range-finding point by using the cross key 108 of the operation unit 227 to confirm the selection through the set button 109. If the AF range-finding points are limited to the usable AF range-finding points in step S303 described above, the AF range-finding point can only be selected from among the usable AF range-finding points when the processing proceeds to step S414 from step S406 or S412. If the operation for registering the AF range-finding point is executed (YES in step S414) the processing proceeds to step S415. If the operation for registering the AF range-finding point is not executed (NO in step S414), the system control unit 50 waits until the operation for registering the AF range-finding point is executed.

In step S415, the system control unit 50 determines whether the current registration mode is the registration mode for a lens-specific AF range-finding point. Specifically, the system control unit 50 can determine the registration mode based on the information stored in the system memory 223. If the current registration mode is the registration mode for a lens-specific AF range-finding point (YES in step S415), the processing proceeds to step S416. If the current registration mode is not the registration mode for a lens-specific AF range-finding point (NO in step S415), the processing proceeds to step S417.

In step S416, the system control unit 50 registers the lens-specific AF range-finding point in association with the lens unit 201 mounted on the lens mount 119. The processing corresponds to an example of processing executed by the registration unit. Specifically, the system control unit 50 stores the AF range-finding point selected in step S414 in the non-volatile memory 222 as the lens-specific AF ranging point in association with the lens ID of the lens unit 201.

In step S417 the system control unit 50 registers the lens-common AF range-finding point. The processing corresponds to an example of processing executed by the registration unit. Specifically, the system control unit 50 stores the AF range-finding point selected in step S414 in the non-volatile memory 222 as the lens-common AF range-finding point.

In step S418, the system control unit 50 determines whether an operation for ending the registration of the switching destination AF range-finding point is executed. If the operation for ending the registration is executed (YES in step S418), the flowchart in FIGS. 4A and 4B ends, and the processing proceeds to step S310 of the flowchart in FIGS. 3A and 3B. If the operation for ending registration is not executed (NO in step S418), the processing returns to step S401. In addition, as described above, if a function of switching the AF position to the registered AF range-finding point is not allocated to any of the operation members of the operation unit 227 in step S401, the processing proceeds to step S418. In this case, the system control unit 50 registers neither the lens-specific AF range-finding point nor the lens-common AF range-finding point, and ends the flowchart in FIGS. 4A and 4B.

Returning to the flowchart in FIGS. 3A and 3B, the processing in step S310 and the subsequent steps will be described.

In step S310, the system control unit 50 determines whether a function of switching the AF position to the registered AF range-finding point is allocated to the operation unit 227. The processing is similar to the processing in step S401. If the function of switching the AF position to the registered AF range-finding point is allocated to the operation unit 227 (YES in step S310), the processing proceeds to step S311. If the above-described function is not allocated to the operation unit 227 (NO in step S310), the processing in FIGS. 3A and 3B ends. However, if the function of switching the AF position to the registered AF range-finding point is not allocated to the operation unit 227, the system control unit 50 may wait until the user allocates the function of switching the AF position to the registered AF range-finding point to the operation unit 227.

In step S311, the system control unit 50 determines whether the operation unit 227 having the allocated function of switching the AF position to the registered AF range-finding point is operated. The operation to be executed on the operation unit 227 having the allocated function of switching the AF position to the registered AF range-finding point is one example of the specific operation. If the operation unit 227 having the allocated function is operated (YES in step S311), the processing proceeds to step S312. If the operation unit 227 having the allocated function is not operated (NO in step S311), the system control unit 50 waits for the operation.

In step S312, the system control unit 50 determines whether a lens-specific AF range-finding point corresponding to the lens unit 201 mounted on the lens mount 119 is registered. Specifically, the system control unit 50 determines whether the lens-specific AF range-finding point associated with the lens ID of the mounted lens unit 201 is stored in the non-volatile memory 222. If the lens-specific AF range-finding point corresponding to the mounted lens unit 201 is registered (YES in step S312), the processing proceeds to step S313. If the lens-specific AF range-finding point corresponding to the mounted lens unit 201 is not registered (YES in step S312), the processing proceeds to step S314.

In step S313, the system control unit 50 switches the AF position to the registered lens-specific AF range-finding point. Accordingly, the AF position can be instantly switched to the AF range-finding point that the user has registered as an AF position for the mounted lens unit 201.

In step S314, the system control unit 50 determines whether a lens-common AF range-finding point is registered. Specifically, the system control unit 50 determines whether the lens-common AF range-finding point is stored in the non-volatile memory 222. If the lens-common AF range-finding point is registered (YES in step S314), the processing proceeds to step S315. If the lens-common AF range-finding point is not registered (NO in step S314), the processing proceeds to step S316.

In step S315, the system control unit 50 switches the AF position to the registered lens-common AF range-finding point. Accordingly, the AF position can be instantly switched to the AF range-finding point which the user has registered as an AF position common to the plurality of lens units 201.

In addition, in the processing in steps S312 to S315, at first, whether the lens-specific AF range-finding point is registered is determined in step S312, and the AF position is switched to the registered lens-specific AF range-finding point if the lens-specific AF range-finding point is registered. If the lens-specific AF range-finding point is not registered, whether the lens-common AF range-finding point is registered is determined in step S314. Accordingly, if the lens-specific AF range-finding point is registered, the AF position is switched to the registered lens-specific AF range-finding point in priority to the lens-common AF range-finding point.

In step S316, the system control unit 50 switches the AF position to an AF range-finding point at the center. As described above, if neither the lens-specific AF range-finding point nor the lens-common AF range-finding point is registered, the AF position is switched to the AF range-finding point at the center, which is assumed to be the position where the user performs autofocusing most frequently in general imaging operation.

In step S317, the system control unit 50 determines whether an operation for ending the switching of the AF range-finding point is executed. If the operation for ending the switching of the AF range-finding point is executed (YES in step S317), the processing of the flowchart in FIGS. 3A and 3B ends. If the operation is not executed (NO in step S317), the system control unit 50 waits until the operation for ending the switching of the AF range-finding point is executed.

According to the present exemplary embodiment, when the specific operation is executed, the AF position is switched to a previously-registered position based on the type of mounted lens unit 201 regardless of the AF position (focus adjustment position) before switching the position. Through the above processing, the AF position is switched to a position previously registered based on the type of mounted lens unit 201 when the specific operation is executed by the user. Accordingly, autofocusing can be performed at a position registered by the user even if an interchangeable lens having a different characteristic is used.

According to the present exemplary embodiment, in addition to a position corresponding to a type of mounted lens unit 201, a position common to a plurality of types of lens unit 201 can be registered as the AF position. Accordingly, the AF position does not have to be registered one by one with respect to all the types of the lens unit 201, so that the AF position can be registered with a single operation if the user would like to perform autofocusing with a common position.

According to the present exemplary embodiment, in a case where a position corresponding to a type of mounted lens unit 201 is registered, the AF position is switched to the position corresponding to the type of mounted lens unit 201 when the specific operation is executed. In a case where a position corresponding to a type of mounted lens unit 201 is not registered, the AF position is switched to the position common to a plurality of types of lens unit 201 when the specific operation is executed. Therefore, if a position corresponding to the type of mounted lens unit 201 is registered, the AF position can be preferentially switched to the position corresponding to the type of mounted lens unit 201. Thus, the user can perform autofocusing at a desired position.

While the present disclosure has been described in detail with reference to the exemplary embodiments, it is to be understood that the present disclosure is not limited to the above-described specific exemplary embodiments, and any variations that do not depart from the essential spirit of the present disclosure are also included within the scope of the present disclosure. Each of the above-described exemplary embodiments illustrate one exemplary embodiment embodying the present disclosure, and thus the exemplary embodiment can be changed as appropriate.

The above-described various types of control described as the processing executed by the system control unit 50 can be executed by a single piece of hardware, or alternatively, a plurality of pieces of hardware (e.g., a plurality of processors or circuits) can share the processing to control the apparatus.

In the above-described exemplary embodiments, an exemplary embodiment in which the present disclosure is applied to a digital camera has been described. However, the present disclosure is not limited thereto, and can be applied to any imaging apparatus on which an interchangeable lens can be mounted. In other words, the present disclosure can be applied to, for example, a smartphone or a tablet on which an interchangeable lens can be mounted.

In addition to the main body of the imaging apparatus, the present disclosure is also applicable to a control apparatus that communicates with an imaging apparatus (including a network camera) via wired or wireless communication to remotely control the imaging apparatus. A smartphone, a tablet personal computer (PC), or a desktop PC are examples of the apparatus that remotely controls the imaging apparatus. Based on the operation or processing executed by the control apparatus, the control apparatus can remotely control the imaging apparatus by transmitting a command that causes the imaging apparatus to execute various operations or settings. The control apparatus can receive a live view image captured by the imaging apparatus via wired or wireless communication to display the live view image.

According to the present disclosure, the user can perform autofocusing at a registered position even if an interchangeable lens having a different characteristic is to be used.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-004993, filed Jan. 16, 2018, which is hereby incorporated by reference herein in its entirety.

What is claimed is:

1. An imaging apparatus comprising:
   a lens mount on which an interchangeable lens is mounted;
   a memory storing at least one program; and
   at least one processor that when executing the at least one program;
   registers a position to which a focus adjustment position is moved when a specific operation is executed;
   determines a type of interchangeable lens mounted on the lens mount; and
   controls, when the specific operation is executed, switching the focus adjustment position to a position registered based on a determined type of mounted interchangeable lens regardless of the focus adjustment position before switching.

2. The imaging apparatus according to claim 1, wherein, positions to which the focus adjustment position is moved when the specific operation is executed, include a position corresponding to a type of interchangeable lens mounted on the lens mount and a position common to a plurality of types of interchangeable lens.

3. The imaging apparatus according to claim 1, wherein the focus adjustment position is switched to a position corresponding to a registered type of interchangeable lens based on the specific operation in a case where a position corresponding to the type of interchangeable lens mounted on the lens mount is registered and the focus adjustment position is switched to a position common to a plurality of types of interchangeable lens based on the specific operation in a case where the position corresponding to the type of interchangeable lens mounted on the lens mount is not registered.

4. The imaging apparatus according to claim 1, wherein a position registerable as the focus adjustment position is limited based on the type of mounted interchangeable lens.

5. The imaging apparatus according to claim 4, wherein, in a case where an interchangeable lens having a greater F-value is mounted, a number of positions registerable as the focus adjustment position is limited to be less than in a case where an interchangeable lens having a smaller F-value is mounted.

6. An imaging apparatus according to claim 1, wherein, as a position to which the focus adjustment position is moved when the specific operation is executed, registerable positions are displayed to a user in a selectable state based on the type of mounted interchangeable lens and a position selected by the user is registered as a position to which the focus adjustment position is moved when the specific operation is executed.

7. The imaging apparatus according to claim 1, wherein, in a case where an interchangeable lens is mounted on the lens mount in a state where an imaging stand-by screen is displayed on a display, at least one item is displayed to enable a user to determine whether a position corresponding to a type of mounted interchangeable lens is registered as a position to which the focus adjustment position is moved when the specific operation is executed.

8. The imaging apparatus according to claim 7, wherein the at least one item is displayed such that the user can select whether to register the position corresponding to the type of mounted interchangeable lens or a position common to a plurality of types of interchangeable lens as the focus adjustment position.

9. The imaging apparatus according to claim 1, wherein, in a case where an interchangeable lens is mounted on the lens mount, a setting screen is displayed for registering a position corresponding to a type of mounted interchangeable lens as a position to which the focus adjustment position is moved when the specific operation is executed.

10. The imaging apparatus according to claim 1, wherein, in a case where an interchangeable lens is mounted on the lens mount in a state where an imaging stand-by screen is displayed on a display, a setting screen is displayed for registering a position corresponding a type of mounted interchangeable lens as a position to which the focus adjustment position is moved when the specific operation is executed.

11. The imaging apparatus according to claim 1, wherein, in a case where a position corresponding to a type of interchangeable lens mounted on the lens mount is not registered while the focus adjustment position cannot be switched to a position common to a plurality of types of interchangeable lens with the interchangeable lens mounted on the lens mount, a setting screen is displayed for registering a position corresponding to the interchangeable lens mounted on the lens mount.

12. The imaging apparatus according to claim 1, wherein, in a case where the focus adjustment position cannot be switched based on the specific operation, a position corresponding to a type of mounted interchangeable lens is prevented from being registered as a position to which the focus adjustment position is moved when the specific operation is executed.

13. The imaging apparatus according to claim 12, wherein, in a case where the focus adjustment position cannot be switched based on the specific operation because a function of switching the focus adjustment position is not allocated to an operation member of the imaging apparatus, the position corresponding to the type of mounted interchangeable lens is prevented from being registered as a position to which the focus adjustment position is moved when the specific operation is executed.

14. The imaging apparatus according to claim 1, wherein the registered position is different for each type of interchangeable lens.

15. A control method of an imaging apparatus including a lens mount on which an interchangeable lens is mounted, the control method comprising:

registering a position to which a focus adjustment position is moved when a specific operation is executed;

determining a type of interchangeable lens mounted on the lens mount; and controlling, when the specific operation is executed, switching the focus adjustment position to a position registered based on a determined type of mounted interchangeable lens regardless of the focus adjustment position before switching.

16. A non-transitory computer-readable storage medium storing a program that causes an imaging apparatus including a lens mount on which an interchangeable lens is mounted to execute a method, the method comprising:

registering a position to which a focus adjustment position is moved when a specific operation is executed;

determining a type of interchangeable lens mounted on the lens mount; and controlling, when the specific operation is executed, switching the focus adjustment position to a position registered based on a determined type of mounted interchangeable lens regardless of the focus adjustment position before switching.

* * * * *